Sept. 7, 1965
A. A. ANDREWS
3,204,362
DEVICE FOR MOUNTING AND LOCKING FISHING
RODS AND THEIR REELING MECHANISM
Filed March 5, 1962
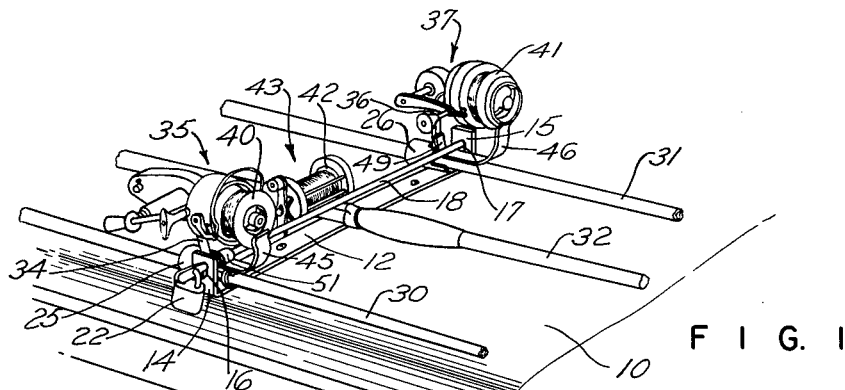
FIG. 1
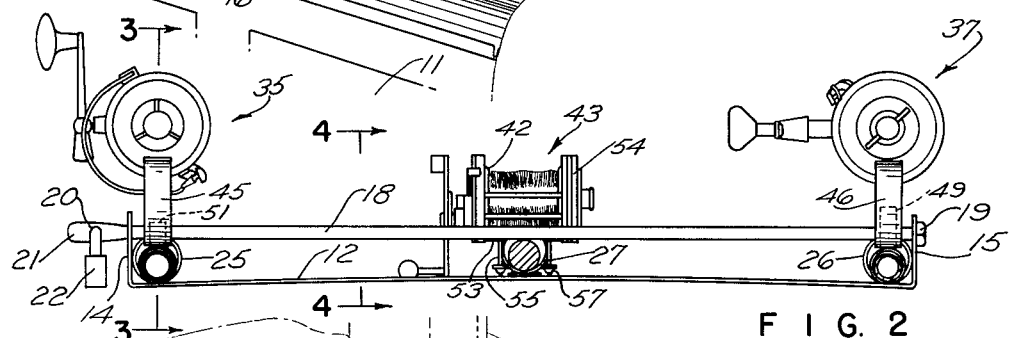
FIG. 2
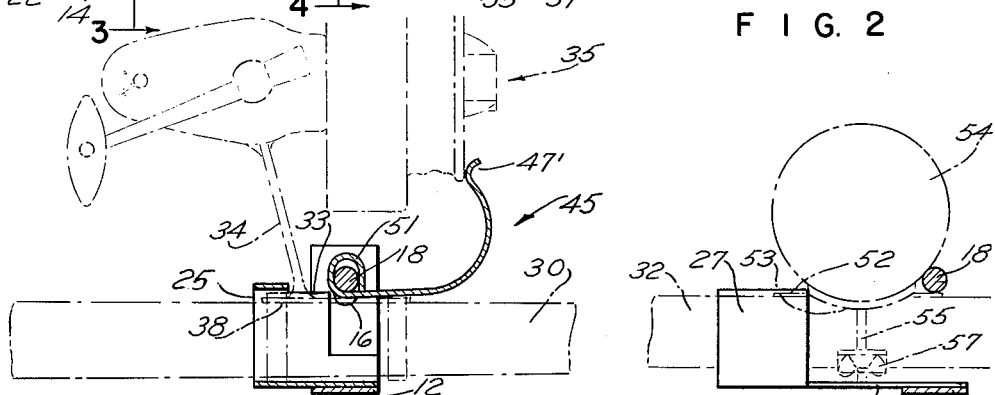
FIG. 3
FIG. 4
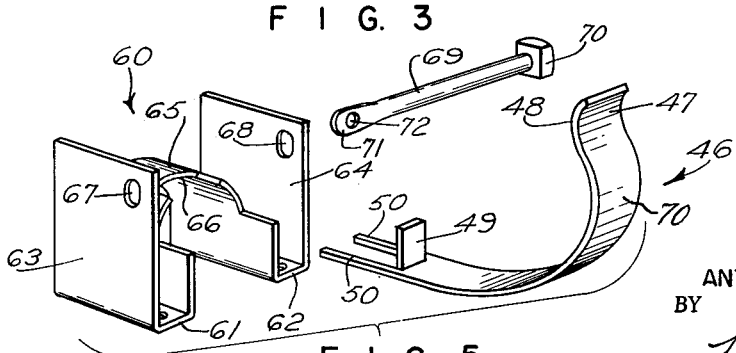
FIG. 5
INVENTOR.
ANTHONY A. ANDREWS
BY
Barlow & Barlow
ATTORNEYS

United States Patent Office 3,204,362
Patented Sept. 7, 1965

3,204,362
DEVICE FOR MOUNTING AND LOCKING FISHING
RODS AND THEIR REELING MECHANISM
Anthony A. Andrews, 19 Adamsdale Ave.,
South Attleboro, Mass.
Filed Mar. 5, 1962, Ser. No. 177,377
4 Claims. (Cl. 43—26)

This invention relates to a locking device for fishing rods and the reeling mechanism for the fishing line which is mounted thereon.

Fishing rods and the lines which are mounted on the fishing rods together with their reeling mechanism are of substantial value. The theft of the rods, reels and fishing lines is quite prevalent in some areas. No means is available on the market or known of locking this sort of gear except within some locked enclosure such as within an automobile or building.

One of the objects of this invention is to provide a device by which the rod, mechanical mechanism for reeling the fishing line and the line itself may be locked so that it may be removed only with destruction of parts which would serve as an alert for detection of the thief.

Another object of this invention is to provide a device which may be mounted upon the top of an automobile or similar carrier so that the fishing rod and its reeling mechanism may be carried upon the top of the automobile and locked in such position.

Another object of the invention is to lock several parts of the equpiment which is to be carried by a simple mechanical operation.

With these and other objects in view, the invention consists of certain novel features of construction as will be more fully described and particularly pointed out in the appended claims.

In the accompanying drawings:

FIG. 1 is a perspective view of a fragmental portion of the top of an automobile with my mounting and locking device in position thereon and showing fragmentally the fishing rods and the line reeling mechanism in locked position;

FIG. 2 is a sectional view through the device separated from the automobile and showing in section only one of the rods shown in FIG. 1 but in elevation the other parts of the part shown in FIG. 1;

FIG. 3 is a section on line 3—3 of FIG. 2 with the rods in phantom;

FIG. 4 is a section on line 4—4 of FIG. 2 with the rods in phantom; and

FIG. 5 is a perspective view of a modified form of the device for use in mounting a single rod in position.

In proceeding with this invention, I have provided a support upon which a rod receiving body member may be positioned either by being integral with the support or fixedly mounted upon the support, the member to receive the rod being usually such that the handle end of the rod may be passed end on through a passage in the same until the reeling mechanism engages the member and may be dismounted by a reverse movement of drawing the rod out of the passage. I then provide a bar which may engage the reeling mechanism on the rod or a bracket engaging the member and be locked holding the reeling mechanism between the bar and the member which receives the rod, all of these parts being retained in position in such a relationship that they will be blocked from removal by the bar which will have one end headed while the other end may be passed through portions to lock them in position and a padlock secured at this other end to prevent removal of the bar.

With reference to the drawings, 10 designates the top of an automobile having side windows 11, and upon this top I mount the body member of the fishing rod receiving and locking device which I designate as 12. This device has its ends turned up to provide arms 14 and 15 at either end thereof, and these arms are each provided with an opening 16 in arm 14 and 17 in arm 15 to receive a bar 18 therethrough. This bar is provided with a head 19 at one end and is sufficiently small and flat as at 21 to be passed through both openings. A hole 20 in this end 21 receives a padlock 22 to prevent its withdrawal from position through the openings 16 and 17.

The body member 12 includes members having rod receiving passages at spaced locations along the length of the body member. Such rod receiving members may be tubular members fixed on the body member 12, there being one adjacent the arm 14 as at 25, one adjacent the arm 15 as at 26 and a third tubular member 27 midway between the two. These tubular members are each fixed to the body member in a manner so that they may not be detached either because of its inaccessibility or because of being obstructed from access by parts of the mechanical reeling mechanism. As shown, each of these members is tubular having a passage of a size so that the rods which are to be secured may be passed therethrough so as to provide a strip over the rod. Thus the rod 30 may be passed through the tube 25, the rod 31 passed through the tube 26 and the rod 32 passed through the tube 27. Conveniently each of these tubular members 25, 26 and 27 are notched at their upper edges as at 33 so that the bracket 34 of the reeling mechanism designated generally 35 on the rod 30 or the bracket 36 of the reeling mechanism 37 on the rod 31 may enter this notch so that this bracket will be set into the tubular member beyond the body member 12 and beyond the bar 18 which extends lengthwise of the body member 12 above it to confine the reel between the bar and member. It will, as will later appear, be necessary to remove the bar 18 in order that the rod and its mechanical reeling mechanism may be positioned in the passages through the tubular members which are to receive them. However, after the bar is replaced, the bracket for the reeling mechanism such as 34 or 36 cannot be removed from the tubular member which receives it, especially as the base 38 of this bracket (FIG. 3) extends along the rod and will remain beneath the encircling or strap portion of the tubular member when the bracket 34 engages the rod as may occur by an attempted releasing motion.

Each of the reeling mechanisms also carries a reel upon which the fishing line is wound, the same being designated as a spool 40 for the reeling mechanism 35, and 41 for the reeling mechanism 37 and 42 for the reeling mechanism 43 of the center rod 32. In the mechanisms such as 35 and 37 shown, the spool may be removed from its winding mechanism in a direction parallel to the axis of the rod, and in order to prevent such removal, I provide a bracket 45 for reeling mechanism 35 and a similar bracket 46 for reeling mechanism 37. The bracket 46 is shown by itself in FIG. 5 and comprises an arm 70 extending laterally of a pseudo-tubular member 65 later described, which member receives the rod, the bracket also having a curved portion reversely bent as at 47 leaving a high point 48 to engage a part of the spool mechanism while at its other end there is a laterally extending retaining portion or lug 49 and cooperating fingers 50 providing a bifurcated end which may be inserted into the tubular member at its upper portion with the fingers extending along the internal surface of the member 65, thereby locating the lug 49 in such position that it provides a point which will engage the bar 18 blocking this bracket from being removed. In this position the end point 48 engages the spool so that it cannot be removed from its assembled position. In some cases instead of the lug 49 being as shown in FIG. 5, which is the condition present in the winding mechanism on the rod 31, the retainer may omit the fingers and the lug may be rolled as shown in FIG. 3 at 51 so as to provide an eye through which the bar 18 may pass, in this case enveloping the bar as it passes therethrough, which is the condition existing in connection with the rod 30, this enveloping situation being shown in FIG. 3 whereas the other form is shown in FIG. 5. In both cases the bar 18 will lock the bracket in place. Both, however, are present in FIGS. 1 and 2, one at one end and one at the other of the base. However, this bracket 45 is as otherwise described for retaining against removal bracket 46 with a reversely bent portion 47'.

The winding mechanism 43 shown upon rod 32 is similar to that shown in patent 2,260,885, there is a base 53 (FIG. 4) with wings 52 attached to the reel mounting side plates 54 making the winding mechanism an integral unit with the base. This base 53 extends along the rod 32 and is bound in position thereon by the threaded studs 55 and wing nuts 57. The wing 52 of this base also extends into the beneath the tubular member 27 through which the rod passes so that this winding mechanism and spool cannot be removed from the rod when the bar 18 is in position as in FIGS. 1 and 4 as this bar extends in close proximity to the side plates 54 of the reeling mechanism, thus locking the reeling mechanism between the bar and the tubular member 27. The threaded members 55 also extend in such close proximity to the foot portion 56 of the tubular member which is attached to the body member 12 that the wing nuts 57 cannot be removed to release the reeling mechanism.

From the above it will be apparent that I have shown slight modifications to lock three different types of reeling mechanisms mounted on three different rods in position by essentially they all conform to the same general relationship of providing a tubular member into which the rod and parts of the reeling mechanism are positioned with a bar extending in such relationship as to block the removal of the reeling mechanism or the rod from such location.

In some cases where a single rod only is desired to be mounted, instead of providing an elongated body member the construction may be as generally appears in FIG. 5 designated generally 60 where a single piece of sheet stock is bent up providing spaced body member portions 61 and 62 with openings for mounting upon the top of an automobile while locking arms 63 and 64 are provided and a pseudo-tubular member 65 is provided intermediate with an arch 66 for the reception of a rod and its reeling mechanism. Openings 67 and 68 are provided in the arms 63 and 64 for the reception of the bar 69 having a head 70 and a flattened end 71 with an opening 72, which flattened end may be passed through the openings to locate the bar back of the bracket for the mechanical reel and locking the same in position. In such case a bracket such as 46 as shown may be utilized for also locking the spool in position in the manner above described.

I claim:

1. A locking device for a fishing rod with a reel unit mounted thereon by a reel base extending along the rod, said device comprising a body member with a rod and reel base receiving horizontally disposed passage including an arcuate inverted U-shaped portion to engage one end portion of the reel unit, a reel retaining bracket having an arm extending laterally of the axis of said receiving passage to engage the reel unit on said rod when the rod is placed in said passage and said bracket having a mounting portion positioned along the upper part of the rod and reel base, said bracket including an arm retaining means extending laterally of the axis of said passage on the opposite side of the reel unit from said inverted U-shaped portion, and a bar engaging said retaining means and extending laterally of the axis of said receiving passage to hold said bracket from movement axially of said passage whereby said reel may be confined between said bar and body member and be locked to said rod and said rod may be locked in said passage.

2. A locking device for a fishing rod with a reel mounted thereon by a reel base extending along the rod, said device comprising a body member with an arcuate rod receiving passage including a strap to confine the rod between it and the body member and of a size to receive axially therethrough and extend over a fishing rod and the mounting base of a reel thereon, arms fixed to the body member and extending upwardly therefrom on opposite sides of the axis of a fishing rod when the rod is placed in said passage, a bar locked to said arm and extending laterally across and above the rod and beneath the reel thereon when the rod and reel are in said passage and said bar being in a proximity to the strap closer than the distance necessary for sliding the reel base in one direction from beneath said strap whereby to block withdrawal of said reel and rod to which it is attached from said strap in one direction, said strap serving to engage said reel and block movement in the other direction.

3. A locking device for fishing rod with a reel mounted thereon by a base extending along the rod, comprising a body member including a tubular member having a horizontally disposed passage of a size to receive axially therethrough and extend thereover afishing rod and the mounting base of a reel thereon, arms fixed to the body member and extending upwardly therefrom on opposite sides of the axis of a fishing rod when the rod is placed in said passage, a bar locked to said arms and extending laterally across the rod and in such close proximity to the tubular member as to block withdrawal of said reel and rod to which it is attached from said passage and a bracket having an eye rolled about said bar, said bracket having an arm which extends laterraly of the axis of the passage into a position to engage said reel to lock the reel in its mounting on the rod.

4. A locking device for a fishing rod with a reel mounted thereon by a base extending along the rod, comprising a body member including a tubular member having a horizontally disposed passage of a size to receive axially therethrough and extend thereover a fishing rod and the mounting base of a reel thereon, arms fixed to the body member and extending upwardly therefrom on opposite sides of the axis of a fishing rod when the rod is placed in said passage, a bar locked to said arms and extending laterally across the rod and in such close proximity to the tubular member as to block withdrawal of said reel and rod to which it is attached from said passage and a bracket having fingers extending into said tubular member and a laterally extending lug engaged by said bar confining said lug between said bar and tubular member, said bracket having an arm which extends laterally of the axis of the passage into a position to engage said reel to lock the reel in its mounting on the rod.

References Cited by the Examiner

UNITED STATES PATENTS

| | | | |
|---|---|---|---|
| 426,655 | 4/90 | Bennett | 248—203 X |
| 2,097,939 | 11/37 | Timm | 211—8 |
| 2,249,302 | 7/41 | Smith. | |
| 2,704,412 | 3/55 | Davis | 43—21.2 |
| 2,835,066 | 5/58 | Spilker | 43—21.2 |
| 2,953,251 | 9/60 | Stone et al. | 211—4 |
| 2,958,422 | 11/60 | Caloieri et al. | 211—4 |

ABRAHAM G. STONE, *Primary Examiner.*

JOSEPH S. REICH, *Examiner.*